United States Patent [19]
Palmers

[11] Patent Number: 5,088,592
[45] Date of Patent: Feb. 18, 1992

[54] METHOD FOR CONVEYING AND DEPOSITING ADHESIVE, FLEXIBLE MATERIAL AND A DEVICE FOR PERFORMING THE METHOD

[75] Inventor: Göran Palmers, Askim, Sweden

[73] Assignee: Institutet for Verkstadsteknisk, Sweden

[21] Appl. No.: 476,476

[22] PCT Filed: Dec. 1, 1988

[86] PCT No.: PCT/SE88/00656
§ 371 Date: Jun. 1, 1990
§ 102(e) Date: Jun. 1, 1990

[87] PCT Pub. No.: WO89/05223
PCT Pub. Date: Jun. 15, 1989

[30] Foreign Application Priority Data
Dec. 3, 1987 [SE] Sweden ................. 8704401

[51] Int. Cl.⁵ .................................... B65G 47/34
[52] U.S. Cl. ...................... 198/465.3; 414/331; 198/812
[58] Field of Search .............. 198/465.3, 812; 414/331, 416; 221/71, 72, 73, 74

[56] References Cited
U.S. PATENT DOCUMENTS

| | | | |
|---|---|---|---|
| 3,941,278 | 3/1976 | Oglander et al. | 221/73 |
| 3,993,189 | 11/1976 | Khoylian et al. | 198/465.3 X |
| 4,194,646 | 3/1980 | Oglander et al. | 221/73 |
| 4,607,744 | 8/1986 | Pak | 221/74 X |
| 4,702,365 | 10/1987 | Pak | 221/74 X |

*Primary Examiner*—D. Glenn Dayoan
*Attorney, Agent, or Firm*—Ostrolenk, Faber, Gerb & Soffen

[57] ABSTRACT

A method for conveying and depositing an adhesive, flexible material by way of a flexible base in right side up position which essentially maintains it shape in a deposition station. The base is supported by a displaceable supporting device equipped with a guiding member, which imparts a direction change to the base. The supporting device at the deposition moves the base away below the material causing the material to be deposited by means of free fall. The material is positioned on the base a distance from the delivery end of the supporting device corresponding to the acceleration distance of the base. The rear end of the base is fixedly attached against displacement. The base is urged to make an abrupt direction change over a guiding member having a very small curvature radius (r) at the front end of the supporting device. The supporting device and the base are simultaneously accelerated rearwardly at an acceleration, which should be at least 1 g.

14 Claims, 10 Drawing Sheets

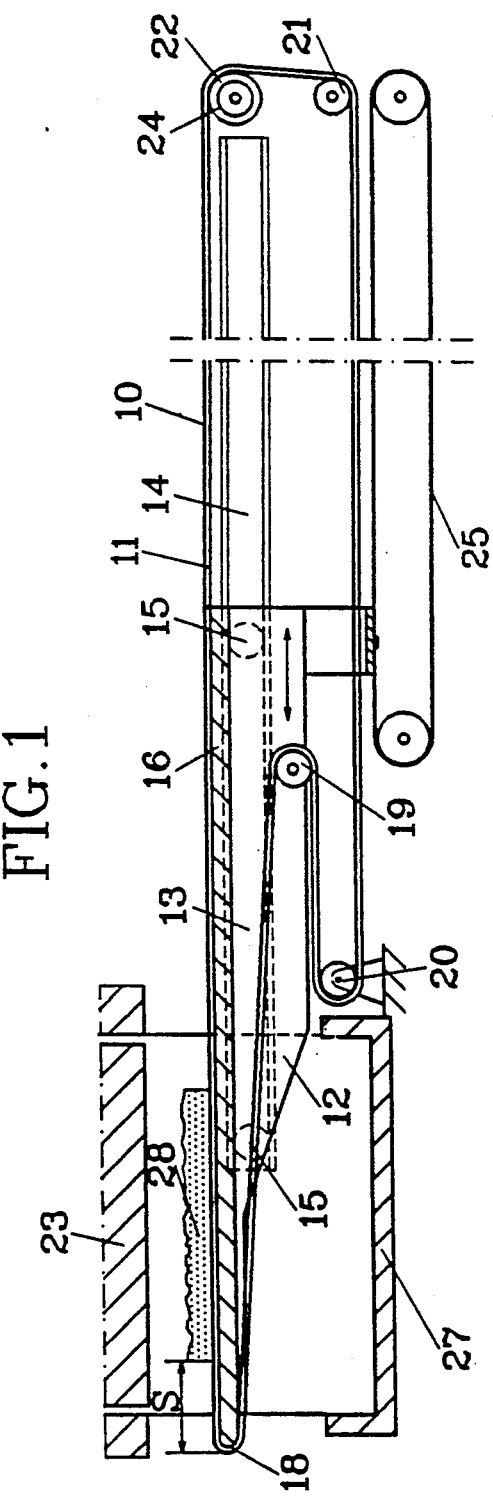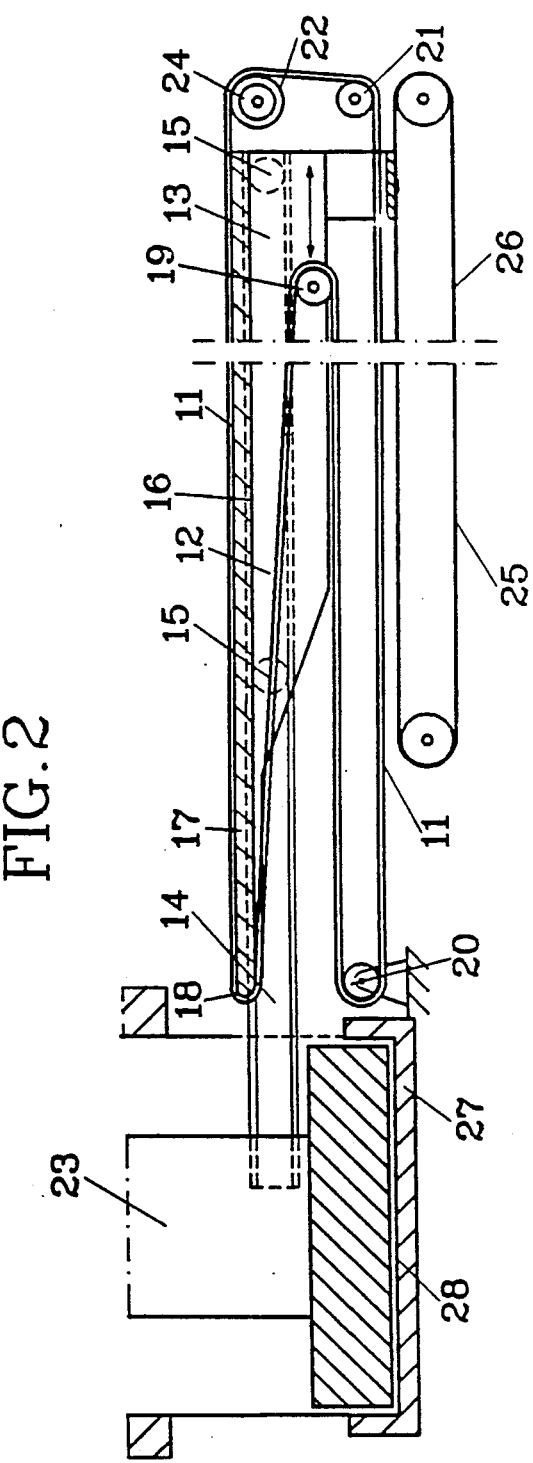

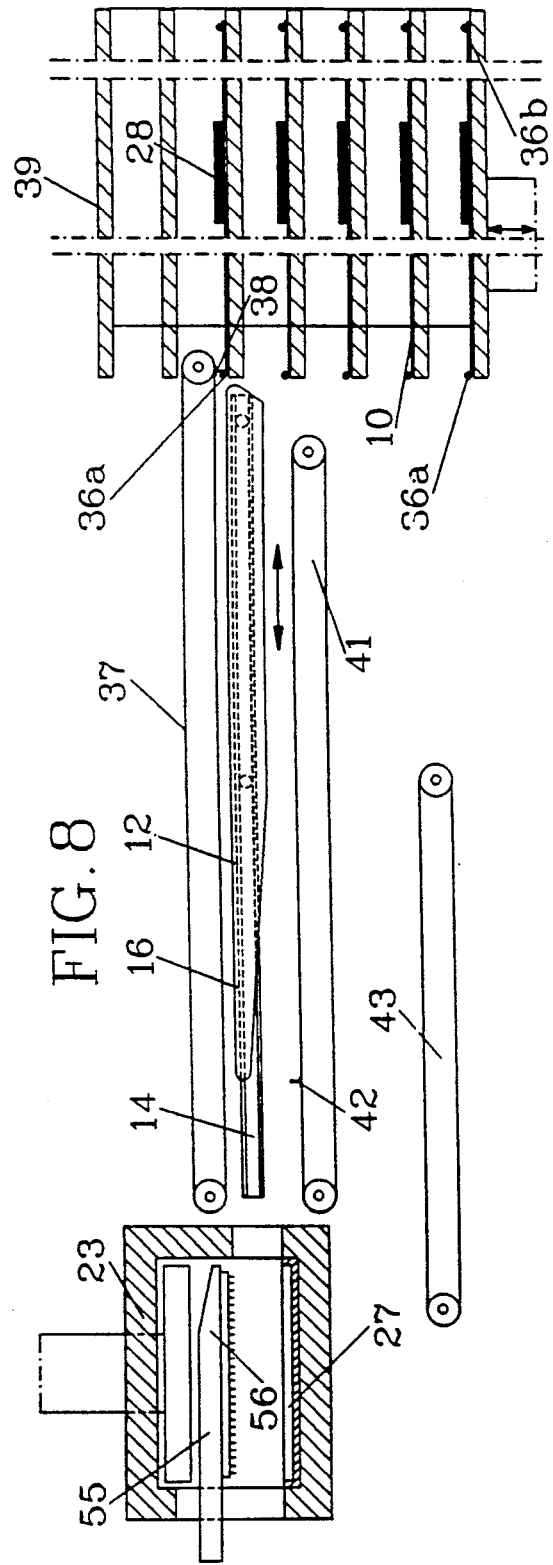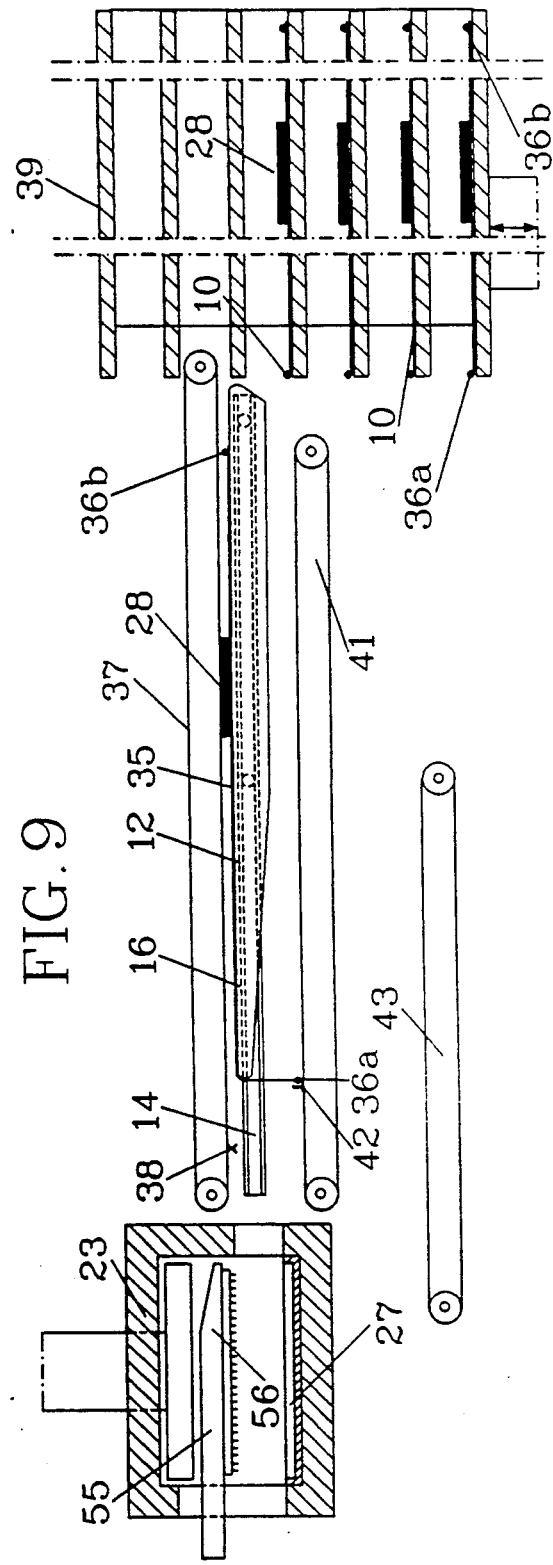

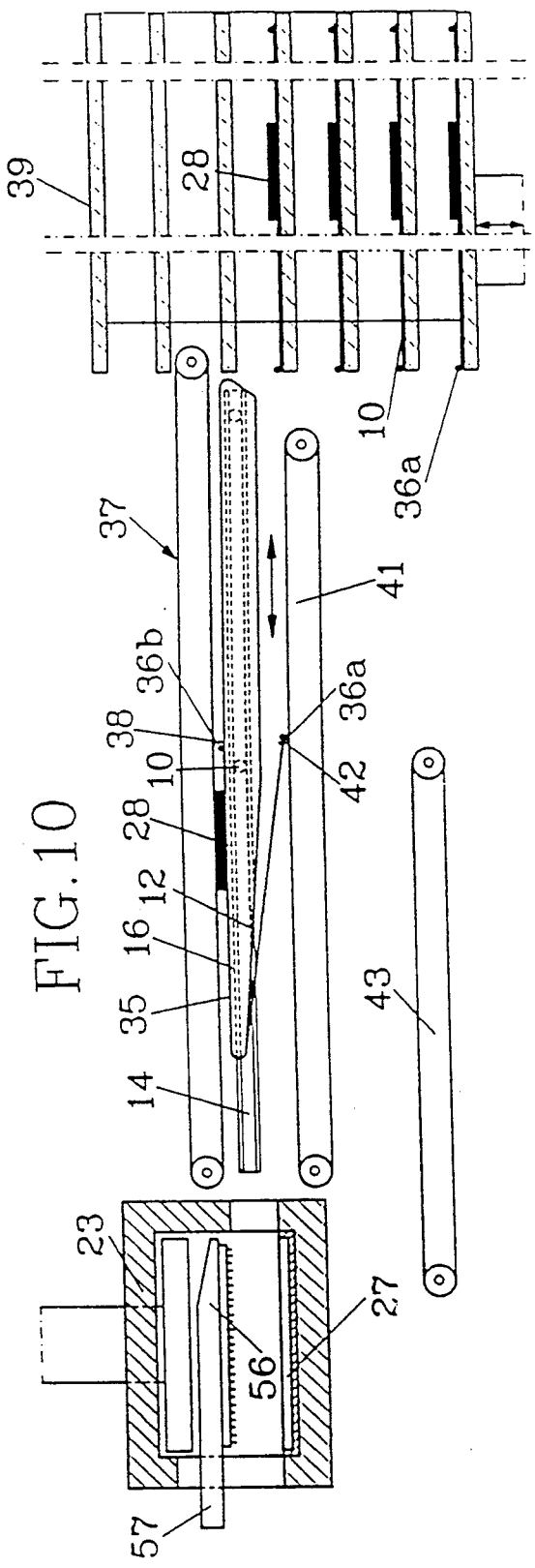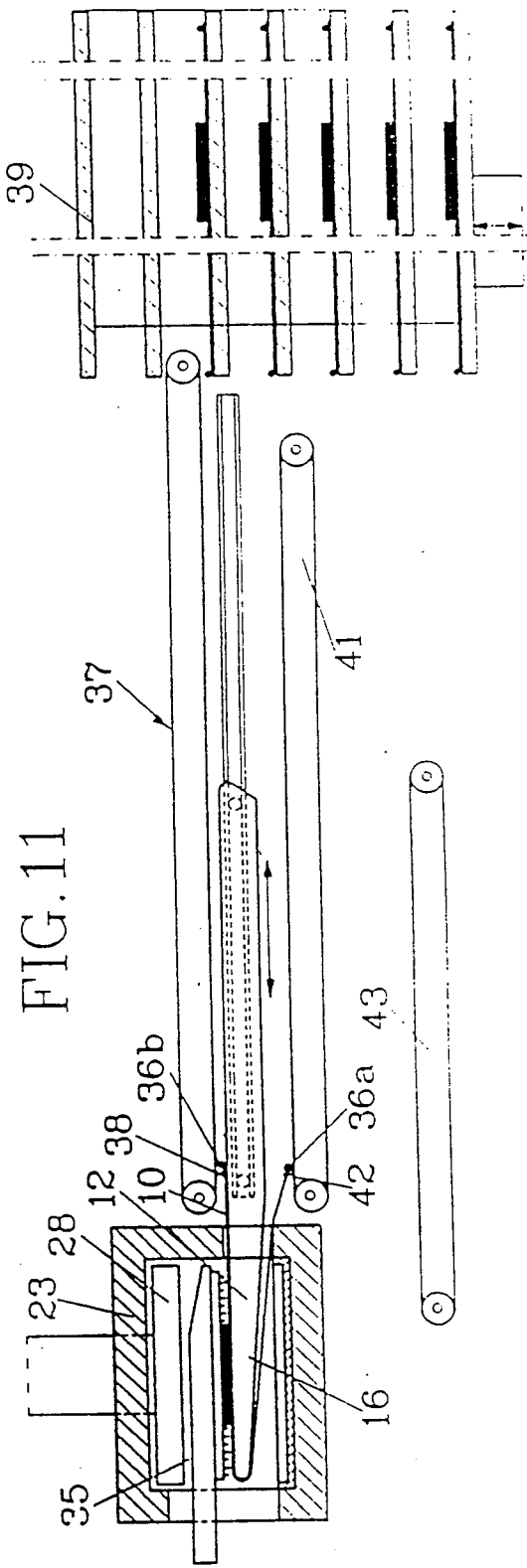

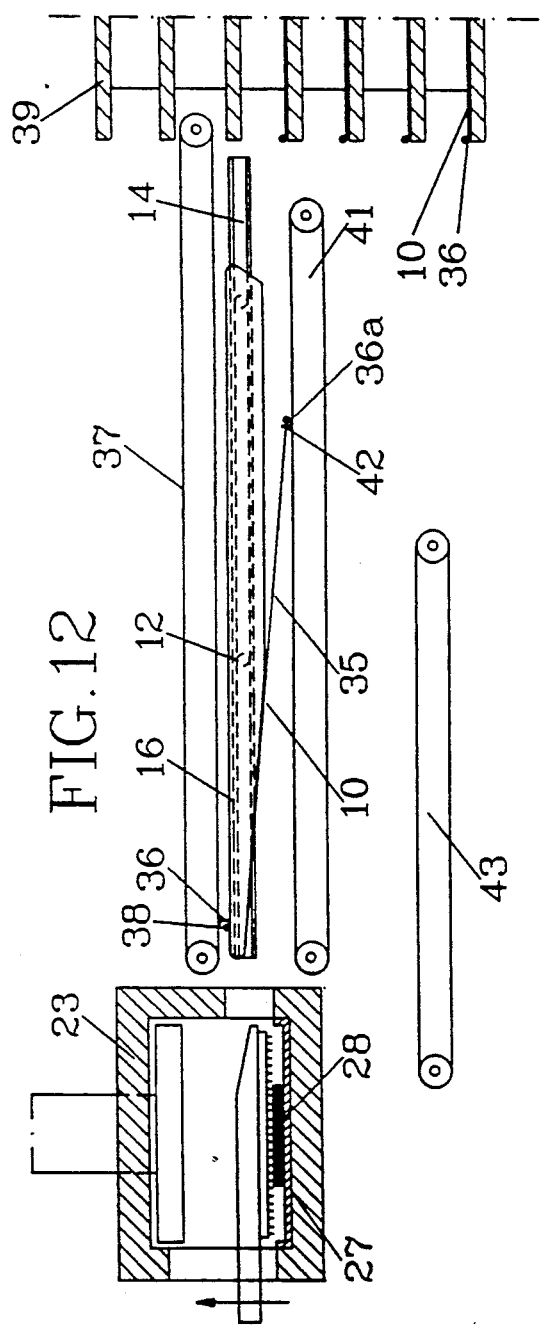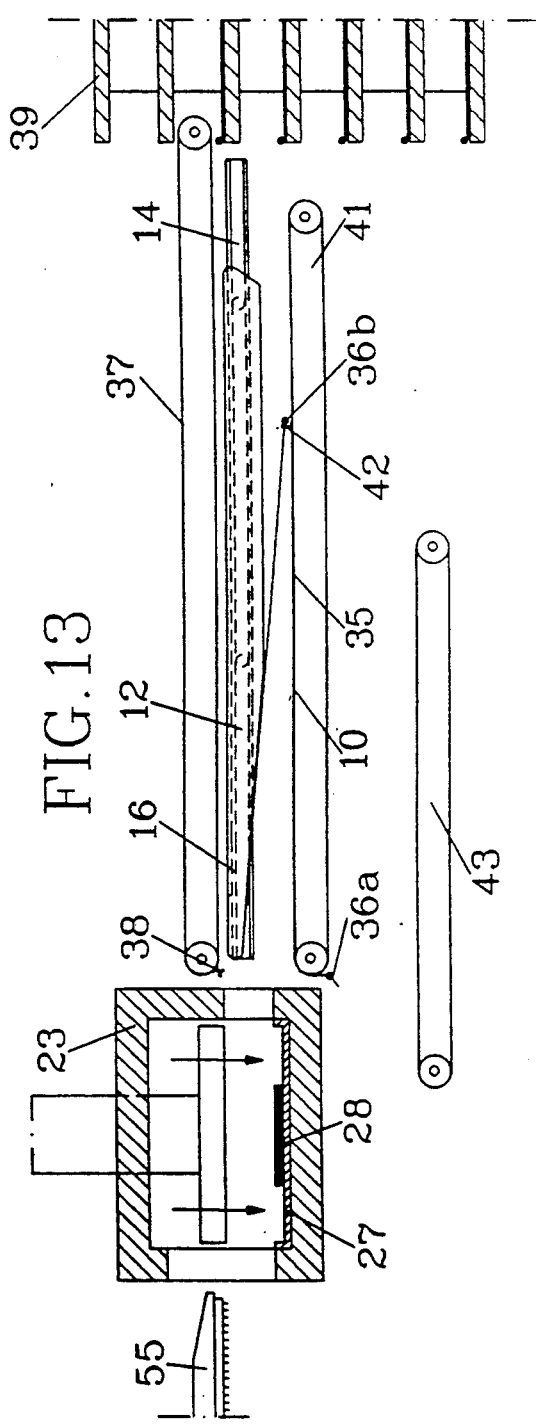

METHOD FOR CONVEYING AND DEPOSITING ADHESIVE, FLEXIBLE MATERIAL AND A DEVICE FOR PERFORMING THE METHOD

The present invention refers to a method for conveying and depositing an adhesive, flexible material by means of a flexible base in right side up position and essentially maintaining its shape on a depositing station, whereby the base is supported by a displaceable supporting device equipped with a guiding member, which imparts a direction change to the base, which supporting device at the deposition moves away the base below the material thus that this is deposited by means of free fall.

BACKGROUND OF THE INVENTION

Devices for transport and deposition of certain perishable objects, e.g. cut up slices of sausage, are earlier known from Swiss patent specification 556285. These known devices can not be used when the material concerned is strongly adhering. Such materials may be thermosetting plastics, which in the form of a dosed sticky mass shall be fed into a heated press, where the actual shaping and setting take place. Another example is thermoplastic resins, which in cold condition are in the shape of plates, which are cut up in accordance with the material consumption in the mould and which are thereupon heated to about 200° C., whereupon the mass, which is also sticky, shall be introduced into a cold mould, where the shaping and the setting take place.

It is possible with this method to produce products, ranging from rather small size of some square decimeters to such in the size of several square meters, e.g. at production of entire boat hulls. It earlier has been tried to solve the problem by conveying the sticky mass on a needle bed, but this method has proven itself to be less suitable, as the mass will stick to the needles and will be difficult to remove when to be deposited. There is further big risk that the mass shall become deformed, resulting in the mass not to be evenly distributed in the mould.

The device mentioned in the introduction can neither be used in the design mentioned, as the adherence of the mass is so strong that it will not be released from the belt, but follows this around the pulley at the end of the track, thus that the mass will stick to the lower side of the conveyor belt.

PURPOSE AND MOST ESSENTIAL FEATURES OF THE INVENTION

The purpose of the invention is to provide a method by which very strongly adhering materials, also in very big slabs, may be conveyed and deposited in a mould without the material undergoing any deformation or coming in contact with any lubricant, intended to reduce the adherence to the conveyor belt, which lubricants may influence the mass negatively. It is necessary that the transfer of the material from e.g. a heating oven to the moulding press can be carried out very swiftly, thus that the material has no time to cool before it reaches the mould. This further implies that the conveyor belt must withstand rather high temperatures. These tasks have been solved in that the material is positioned on the base a distance from the delivery end of the supporting device corresponding to the acceleration distance of the base, that one, the rear end of the base is fixedly attached against displacement, that the base is teared away from the contact surface in that it is urged to make an abrupt direction change over a guiding member of small curvature radius (r) at the front end of the supporting device and by the supporting device and portions of the base being simultaneously moved rearwardly, whereby the centripetal acceleration of the base around the curvature radius (r) of the guiding member is at least 1 g when the curved portion of the base is below the material.

DESCRIPTION OF THE DRAWINGS

The invention hereinafter will be further described in form of some embodiments with reference to the accompanying drawings.

FIG. 1 shows a section through a first embodiment of a conveyor and deposition device according to the invention, with the conveyor belt in a forwardly extended deposition station.

FIG. 2 is a section analogous with FIG. 1, but with the conveyor belt in retracted position, after deposition of material.

FIGS. 8–13 show sections through a fourth embodiment of the device according to the invention in different operative positions.

DESCRIPTION OF EMBODIMENTS

Figure 3:
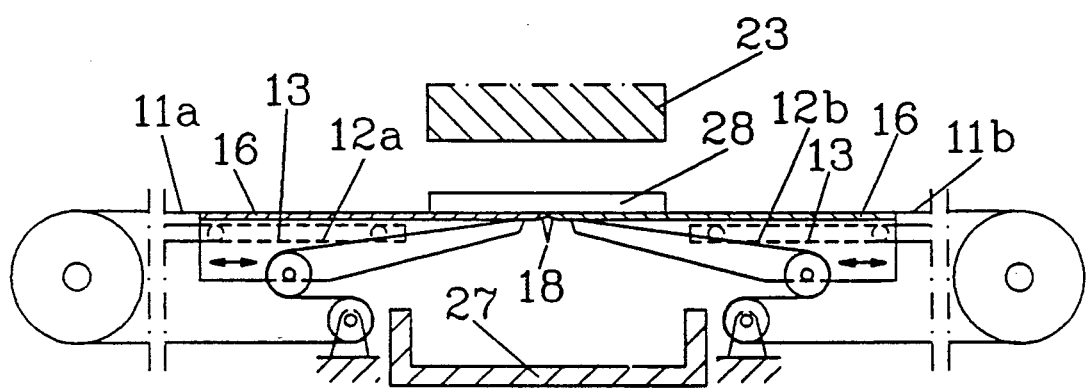
FIG. 3 shows a second embodiment of the device according to the invention, also in section and having two cooperating conveyor belts arranged in series.

The conveying and depositing device according to the embodiment shown in FIGS. 1 and 2 comprises an endless conveyor belt 11, which also forms a base (10) for the material 28 to be deposited, and which is driven by a driving device, which is not further shown. The belt 11 is along a portion thereof supported by a supporting device 12. The supporting device 12 consists of a trolley 13, which via appropriate friction reducing means, e.g. wheels 15 is displaceable along guides 14. The trolley 13 supports a plate 16 or the like, the front end 17 of which is arranged cantilever-wise and is designed as a guiding member 18, about which the belt 11 is led about 180° to a pulley 19, which is supported in the trolley 13. The belt 11 continues from the pulley 19 to a stationary pulley 20 adjacent a moulding press station 23 and is led back to the upper side of the plate 16 via stationary pulleys 21 and 22. In the last mentioned pulley is furthermore provided a blockup device, such as a brake 24, by which the movement of the belt 11 can be blocked.

By means of a guiding device 25, e.g. in the form of an endless belt 26, driven by a not further shown driving apparatus, the trolley 13 is displaceable towards and away from a deposition station 27, which can be constituted by a mould positioned in said moulding press station 23.

The maximum tearing off force available $$\sigma_{max} = acc \cdot \frac{mass}{area} + \text{flexural rigidity} - \text{garvity acceleration}$$

The maximum tearing off force $\sigma_e$ required is dependent on the relation between the surface tension of the belt 10 and the material 28. The lower surface tension the belt has in relation to the material 28, the more will the adherence be reduced (according to the thermodynamical adsorption theory).

In order to obtain the required tearing off force between the contact surface of the adhering material 28 and the belt, it is necessary that the belt portion upon which the material 28 rests is pulled away at such a speed, that the tearing off effect aimed at is obtained. Practical tests have confirmed this theory and show that the curvature radius r of the guiding member 18, see FIG. 7, has a certain relation to the speed by which the belt is pulled away from the material 28. In accordance with the equation of forces F=m.a, wherein F=force, m=mass of body and a= acceleration, it is possible—if a is set to be equal to $v^2/r$ where v=is the speed in m/s and r is the curvature radius of the guiding member 18—to calculate the ratio between the curvature radius r and the speed at which the trolley 13 must be pulled back for obtaining a satisfactory tearing off. It furthermore has proven itself that the curvature radius r must be small i.e. the transitory portion between the horizontal and vertical surface of the plate 16 must be almost sharp-edged. A curvature radius of 5 mm and a pulling speed of 1 m/s gives an acceleration of 200 m/s$^2$, i.e. 20 g (g=acceleration of gravity). For reaching the correct speed during the pulling moment, the material 28 is preferably positioned at some distance S from the end of the belt, which distance corresponds to the acceleration distance required for removing the adherence of the material. Also the surface coating of the conveyor belt 11 is of importance in this connection and in the present embodiment it has been assumed that the belt is coated with a coating having a low surface tension, e.g. a material on sale under the trade name TEFLON ®.

As the adhering material can consist of big, soft slabs of several meters length and breadth, it is not possible to provide a pulley as a guiding member 18. The friction reduction around the guiding member is according to the invention preferably effected by means of air or gas lubricated bearing surfaces 29, with or without rotatable bearing bodies, and in which opens a plurality of channels 30, which communicate with a conduit system system 31 connected to a source (not shown) of pressurized air or the like.

The procedure at transport and deposition of an adhering material is the following:

A piece of material 28, e.g. a thermoplastic resin, which is adapted to size and thickness, is positioned in the shape of a fixed disc on the rear end of the conveyor belt 11, i.e. the end which is turned away from the moulding press station 23. The conveyor belt passes through a not shown heating oven, wherein the material is heated to e.g. 212° C., i.e. the temperature at which the shaping in the press 23 shall take place. As soon as the correct temperature has been reached, the material 28 is conveyed to the position shown in FIG. 1, i.e. the distance S from the belt end and just above the deposition station 27. With the material 28 in this position the upper part of the conveyor belt 11 is blocked, by the brake 24 being applied. Immediately thereupon the displacement of the trolley 13 is started in the right hand direction in FIG. 7 at such an acceleration, that the speed of the trolley, when the material has reached the deposition station of the guiding member, has reached such a value that $\sigma_{max}$ is bigger than the required tearing off force $\sigma_e$. The retraction of the belt takes place to such an extent, that the pressing tool of the moulding press 23 can be activated and presses the deposited material 28 to the desired shape. After ejection of the moulded goods and return to initial position of the pressing tool, the trolley 13 is returned to the position shown in FIG. 1.

Figure 4:
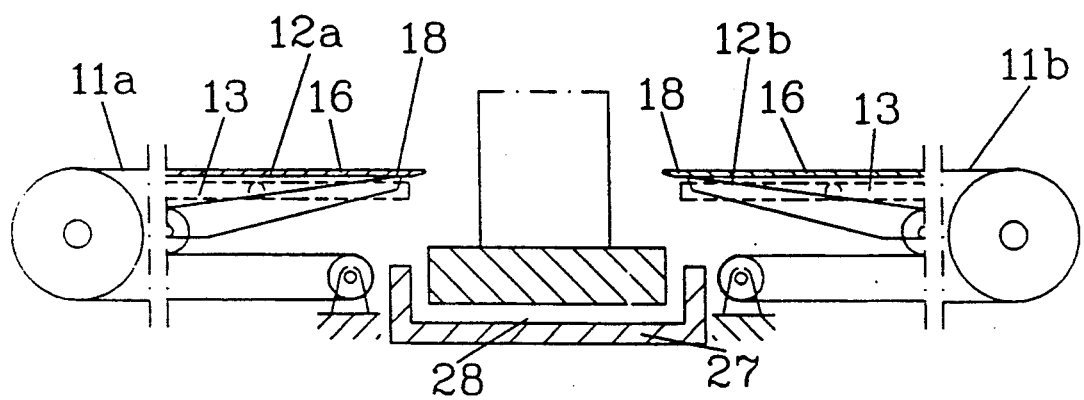
FIG. 4 shows the device according to FIG. 3, but with the conveyor belts in retracted positions.

At certain, very heavily adhering materials it may be necessary to subdivide the tearing off surface into two areas, each one of which is represented by a separate endless belt in the same manner as in the embodiment according to FIG. 1 and 2. In FIG. 3 and 4 such an embodiment is shown, where those two endless conveyor belts 11a and 11b are arranged in series after each other with their deposition ends, i.e the guiding members 18 facing each other. At deposition of the material 28, the conveyor belts 11a and 11b, in this case will be pulled away from each other, such as shown in FIG. 4.

Figure 5:
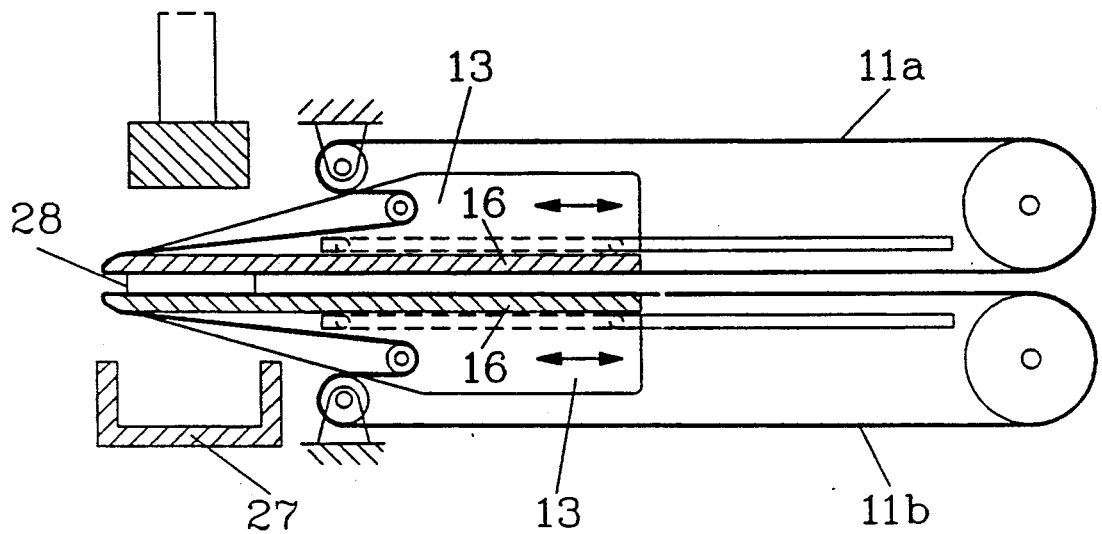
FIG. 5 shows a section through a third embodiment, wherein two conveyor belts are arranged above each other.
Figure 6:
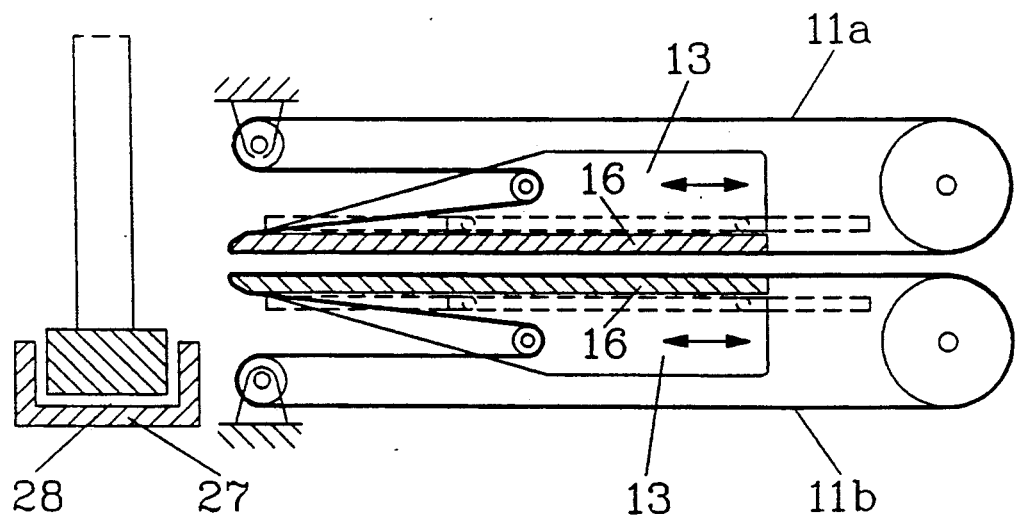
FIG. 6 shows a section through the device according to FIG. 5, but with the conveyor belts in retracted positions.

In certain cases it is necessary that the material 28 during transport from the application thereof on the conveyor belt 11 and up to the deposition, may not alter its shape and for this purpose has been developed the embodiment shown in FIGS. 5 and 6. Also in this embodiment are provided two conveyor belts 11a and 11b, which are provided with one supporting device 12 each, and which belts are arranged in parallel above each other and at such a distance from each other that there is space for a piece of the material between the belt portions facing each other.

In cases where the adhering material shall be subjected to several stages of treatment at different work stations, which can not be accomodated by one conveyor belt only it is possible to use the embodiment shown in FIGS. 8–13. The adhering material 28 in this example is applied on a base 10, which is constituted by a loose track of material 35, e.g. a plastic film, which in its front and rear ends is reinforced and provided with carriers 36a and 36b in the form of transverse rods or the like, which have such a length that they project outside the supporting device 12, where the rod ends cooperate with appropriate conveyor means provided beside the supporting devices 12. In the same manner as in the embodiments described hereabove the device according to the invention incorporates a supporting device 12, which is displaceable along horizontal guides 14 by means of a not further shown driving device. The supporting device 12 in this embodiment has no endless belt 11, which means that the base 10, i.e. the material track 35, by means of the conveyor device 37 is pulled along the plate 16 of the supporting device 12. At the transport device 37 is provided a carrier member 38, e.g. a hook, which engages behind the rod ends 36a. The conveyor device 37 is preferably constituted by two endless chains positioned along the side edge of the supporting device 12, thus that its entire plate 16 is free and the adhering material 28 may be freely advanced along this. At the lower side of the supporting device 12 is provided a second conveyor 41, also in form of two endless chains on each side of the supporting device 12, and which are each one equipped with a carrier member 42 formed as a hook for cooperation with the front carrier 36a of the base 10. A vertically adjustable stand, which e.g. may be a heating oven is designated 39, and on the shelves thereof are arranged bases 10 with applied adhering material 28.

The device operates in the following manner: The adhering material 28, e.g. in the form of a rigid, pre-cut disc is arranged on the base 10 in a predetermined position, e.g. directly in the stand 39 of the heating oven and with the base 10 in a position in which the carrier members 38 of the conveyors 37 can be interconnected with the front carrier 36a of the base 10, such as shown in FIG. 8. The material pieces 28 in the heating oven are heated successively and obtain their soft, adhering consistency. Activating the conveyor device 37 causes the base 10 with the material 28 to be pulled over so far upon the plate 16 of the supporting device 12, that the front carrier 36a will be situated a distance outside the front end of the supporting device 12. In this position the carrier 36a is disengaged from the conveyor device 27, with the front edge of the base 10 hanging below the front part of the supporting device 12, such as shown in FIG. 9. The carrier 36a in this position can be interconnected with the carrier 42 of the conveyor device 41. The carrier 38 of the conveyor device 37 at the same time makes a return movement and is interconnected with the rear carrier 36b of the base 10, see FIG. 10. Having the front and rear ends of the base connected to one conveyor device 37 and 41 each, the front end of the supporting device 12 is displaced into the press 23 above the deposition station 27, such as shown in FIG. 11. With the adhering material 28 in this position the pulling moment is started, i.e. the supporting device 12 is displaced backwards in a direction away from the press 23 at a high speed at the same time as the conveyor device 37 remains in immobile position, which means that the rear edge of the base 10 is held while the conveyor device 41 is activated, which during the entire pulling moment keeps the part of the base 10 situated below the supporting device 12 in a stretched condition.

Figure 7:
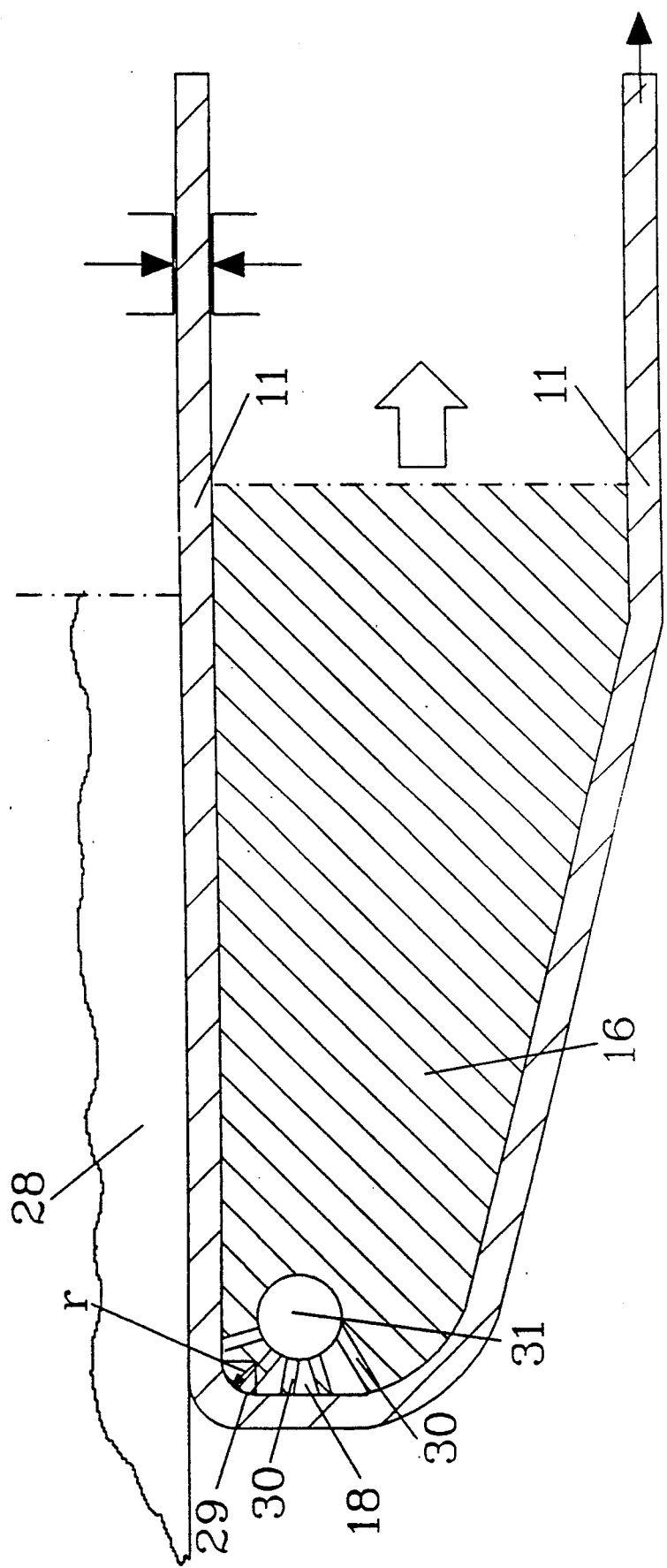
FIG. 7 shows in bigger scale a section through the front end portion of the supporting device during the tearing off stage.

During the very pulling procedure the base 10 is pulled over the only slightly rounded front edge of the conveyor device 12, whereby the tearing off takes place between the surface of the base 10 and the contact surface of the material 28, such as shown in FIG. 7. The material 28 at this tearing off will remain in the position and shape it occupied before the pulling and it then can begin to fall vertically down onto the deposition station 27.

In certain cases, e.g. when the material 28 is rather thin, or has its centre of gravity positioned thus, that it after having been teared loose will fall uncontrolled towards the mould 27 and/or if this is inclined, it may be necessary to guide the piece of material 28 during the fall until it has stuck to the mould. This can be effected by means of a guiding member 55, which is displaceable horizontally into and out off the press 23, and which in its activatable position is located above the piece of material 28 introduced in the oven and resting on the supporting device 12. On its side facing the material 28 the guiding member 55 is provided with a number of fork pegs 56 of drawing pin type. The guiding member 55 is displaceable both in horizontal and in vertical direction along suitable guides, thus that the pegs 56 can penetrate into the material 28, such as shown in FIG. 11. After the material having been teared off from the base 10, the guiding member 55 will accompany the material during its fall towards the mould 27, FIG. 12, whereby the material is guided in a controlled manner, in that the guiding member is guided in not shown guides. The drawing pin shape of the fork pegs prevent the pegs from penetrating too deep into the material. The guiding member thus guides the piece of material 28 until this has reached the mould 27 and has come to adhere to this, whereupon the member is retracted to its parking position and is witdrawn horizontally out off the mould, which thereupon makes its pressing operation. It is also possible to co-ordinate the horizontal movement of the guiding member 55 with the movement of the conveyor 37 and that the guiding member is caused to come to engagement with the material outside the press 23.

The base 10 thereupon can be fed to a catching device 43, which possibly may be a further conveyor belt. During the very pressing operation the stand 39 is fed one step upwards, thus that a new piece of material 28 can be pulled in on the supporting device 12.

The handling of the adhering material 28 requires in the embodiment according to FIGS. 8–13 a comparatively long base relative to the size of the material, which in certain cases can be a drawback. In the embodiment according to FIGS. 14–18 is shown an arrangement wherein the base 10 needs be only slightly bigger than the adhering material 28.

Figure 14:
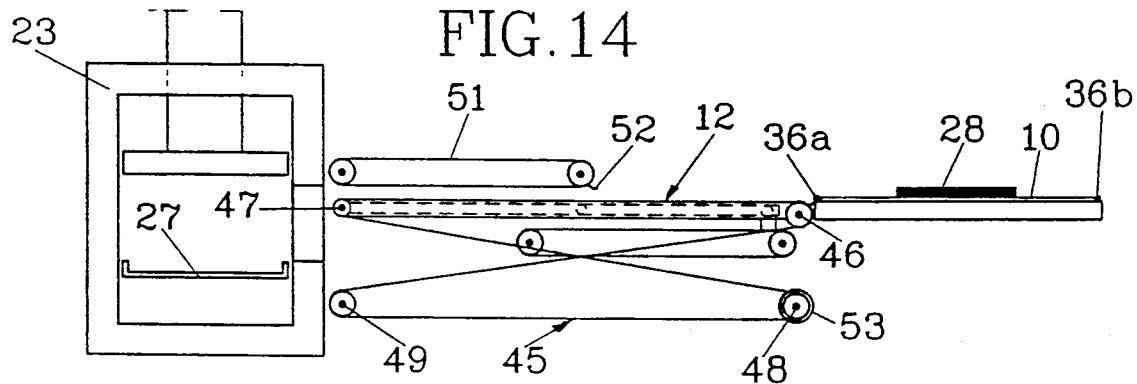
FIGS. 14–17 show sections through a fifth embodiment of the device according to the invention also in different operative positions.
Figure 15:
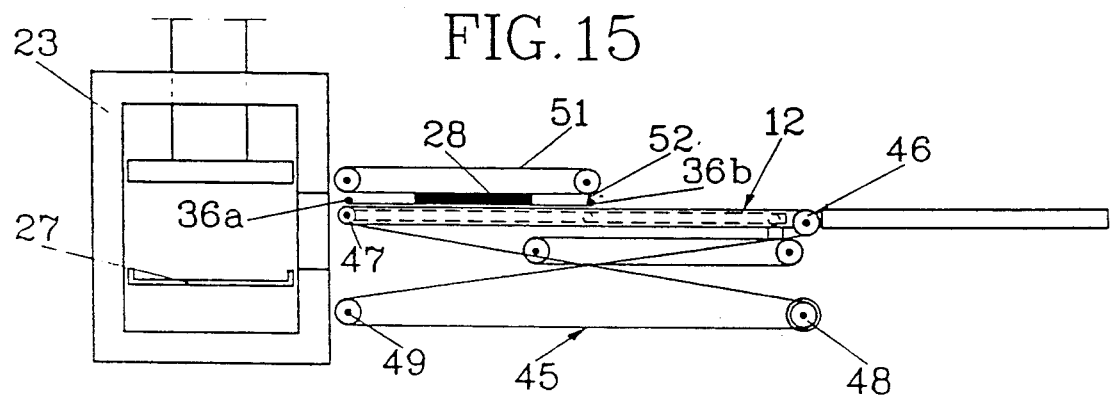
Figure 16:
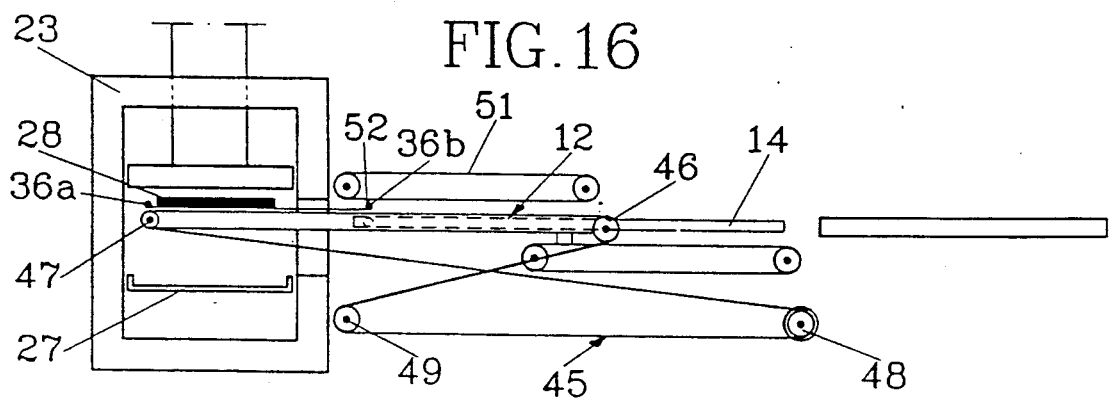

The base 10 also in this embodiment is pulled in on the supporting device 12 by means of a conveyor device 45 consisting of two endless wires situated outside the supporting device 12 and along its two side edges. The conveyor wires 45 are led about pulleys 46 and 47 supported at the rear and front edge resp. of the supporting device and about two fixedly arranged pulleys 48 and 49. For the sake of clarity the pulleys 48 and 49 in FIGS. 14–17 have been pulled out somewhat from the pulleys 46 and 47 in order clearer to show that the conveyor wire is arranged in form of an eight. Each one of the conveyor wires 45 is provided with one carrier 50 in the form of a hook, a peg or the like, which engage behind the front rod ends 36a of the base 10, such as shown in FIGS. 14 and 18. The carriers 50 pull the base 10 up to the front end of the supporting device 12, in which position a second conveyor 51 equipped with a carrier 52 interconnects this with the rear rod 36b of the base 10, such as shown in FIG. 15. The supporting device thereupon may be displaced in its guide thus that its front end portion will be situated in the press 23, illustrated in FIG. 16.

Figure 17:
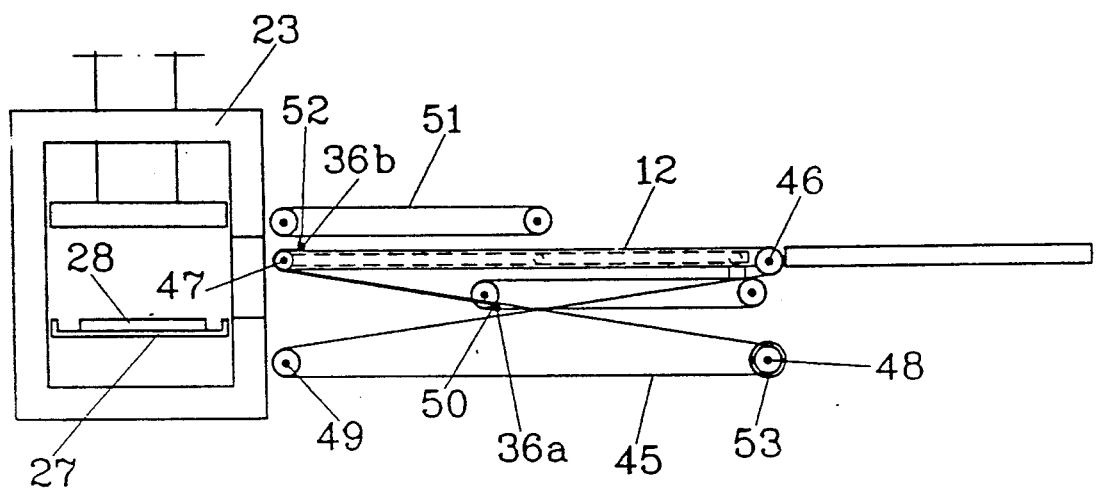
Figure 18:
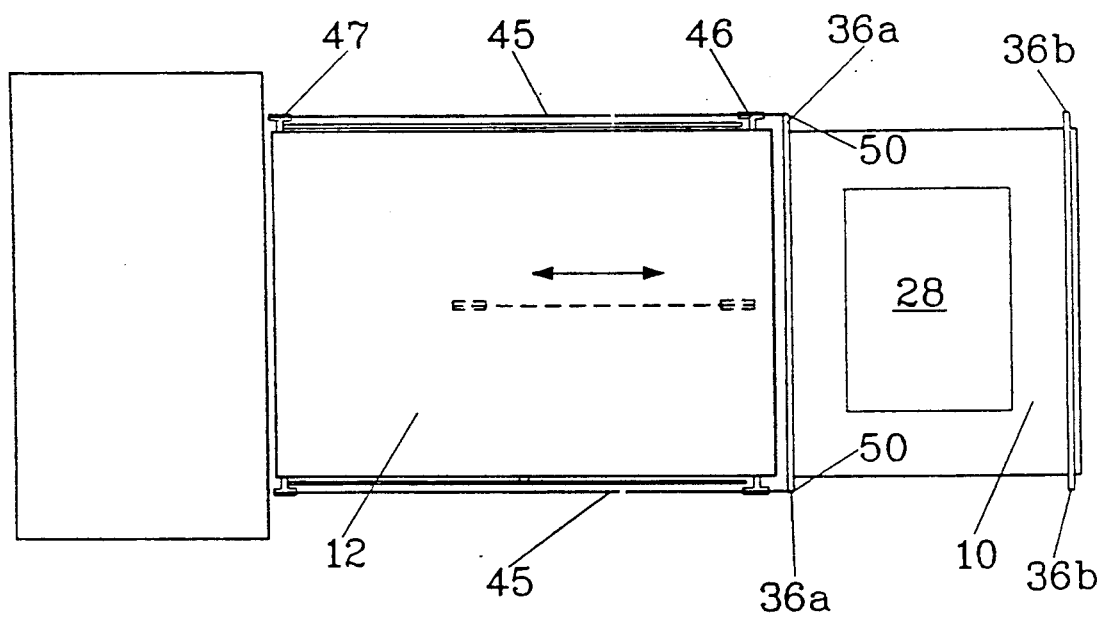
FIG. 18 shows the device according to the FIG. 14 in a view from above.

The very pulling is effected by means of the driving unit 53, which drives the conveyor belt 45, and which by means of the carrier 50 on one hand causes the desired tearing off but on the other hand also gives the supporting device 12 a return movement out off the press 23, such as shown in FIG. 17.

Figure 19:
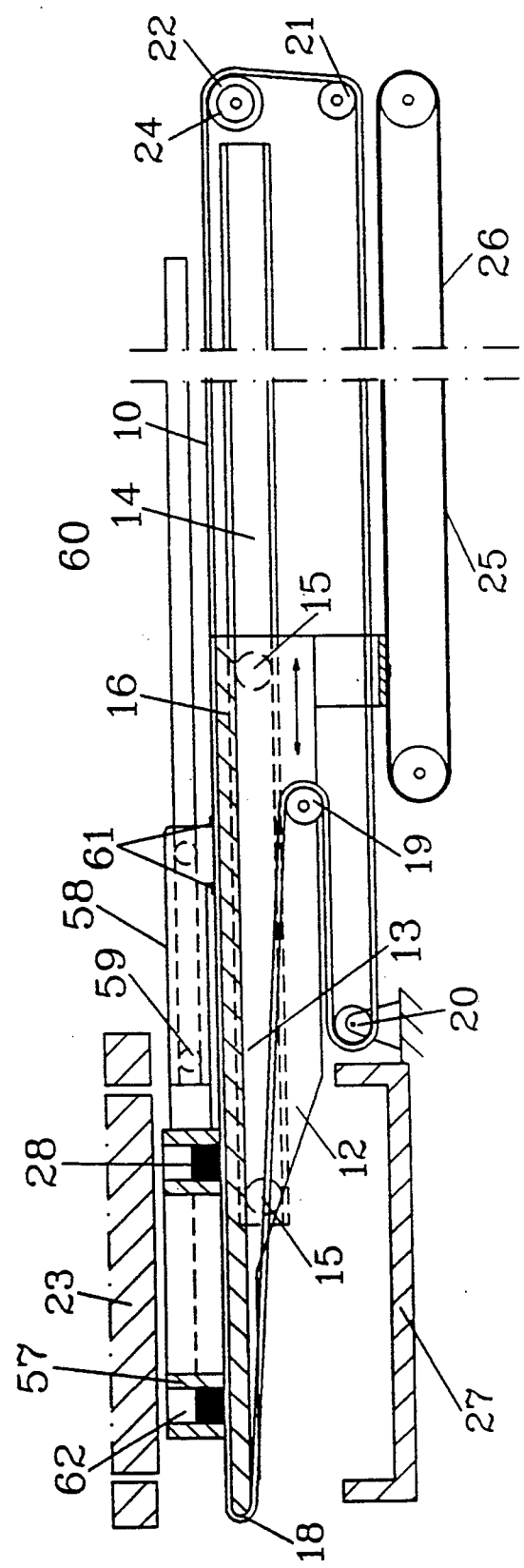
FIG. 19 shows a section analogous with FIG. 1, through a further embodiment.

Certain materials 28 has such consistency that they are not shape permanent. It can also occur pieces of material 28, which has such height that they during transport to the press must be backed up. This can be effected according to the invention by means of a supporting member 57, shown in FIG. 19, which supports or shapes the material up until the tearing off from the base 10. In FIG. 19 is shown an annular supporting member 57, but this may of course have any other desired shape. The supporting member 57 is supported by an arm 58, which via wheels 59 is guided in a guide 60.

The arm 58 cooperates with two shoulders 61 fitted to the base 10, which in the embodiment shown is an endless belt. The supporting member 57 has no bottom, but this is formed by the base 10, which during the tearing off moment leaves the lower side of the supporting member, thus that the material 28 may fall downwards. The shaping or supporting space 62 of the supporting member may possibly be designed so that it may be attached to a source of pressurized air intended to press out the material 28.

I claim:

1. A method for conveying an adhesive, flexible material to a deposition station and depositing such material therein by means of a device comprising a flexible base in a right-side-up position which essentially maintains its shape in the deposition station, the base being supported by a displaceable supporting device, displaceable to and from the deposition station, the supporting device having a guiding member with a front end normally facing the deposition station, the front end having a radius of curvature (r) which imparts a direction change to the base, which method comprises:

positioning the adhesive flexible material on the base at one end thereof and at a distance from the front end of the supporting device corresponding to a predetermined acceleration distance of the base;

blocking an end of the base opposite to said one end to prevent displacement of the base;

moving the supporting device in the direction away from the deposition station, such that the base is urged to make an abrupt direction change over the front end of the guiding member, the supporting device being moved at a speed such that the centripetal acceleration of the base around the radius (r) of the guiding member is at least 1 g, to thereby disengage the base from the material causing the material to be deposited by means of free fall.

2. A device for performing the method according to claim 1 for conveying an adhesive, flexible material and depositing such material at a deposition station, which comprises: at least one flexible base, at least one supporting device supporting the base and being displaceable in a longitudinal direction to and from the deposition station and having at one of its ends a guiding member having a front end normally facing the deposition station, the front end having a radius of curvature (r), such as to impart to the base a direction change, a blocking device for selectively blocking displacement of the base, a first driving device for displacing the base, and a second driving device for driving the supporting device, characterized therein, the base being coated with a coating and the movable supporting device, being moveable rearwardly in a direction away from the deposition station while the base is blocked from displacement, the supporting device being movable at such a speed that the part of the flexible base at the front end of the guiding member is caused to make an abrupt direction change with a centripetal acceleration around said front end of at least 1 g.

3. A device as claimed in claim 2, wherein the base comprises an endless, drivable conveyor belt.

4. A device as claimed in claim 2, wherein the base comprises a loose material track having opposed ends which are alternatingly connectable to the first driving device with one end being connectable to the second driving device.

5. A device as claimed in claim 2, wherein the first driving means includes a plurality of carrier members and the base comprises a loose material track having opposed ends which are connectable to the carrier members.

6. A device as claimed in claim 2, wherein the guiding member is provided with friction reducing means in form of gas-lubricated bearing surfaces.

7. A device as claimed in claim 2, which further comprises a second flexible base, a second supporting device being displaceable in a longitudinal direction to and from the deposition station and having at one of its ends a guiding member for such second supporting device, the guiding member for the second supporting device having a front end normally facing the deposition station, such front end for the guiding member for the second supporting device having a radius of small curvature (r) such as to impart to the second base a direction change, a second blocking device for selectively blocking displacement of the second base, a third driving device for displacing the second base and a fourth driving device for driving the second supporting device, the second base being coated with a coating, the one supporting device and the second supporting device being arranged in series after each other with the respective front ends of their respective guiding members facing each other and in close connection to each other and being directed towards the deposition station, the second supporting device being movable in a direction away from the one supporting device while the second base is blocked from displacement, the second supporting device being movable at such a speed that the part of the second base at the front end of the guiding member of the second supporting device is caused to make an abrupt direction change with a centripital acceleration around the front end of the guiding member of the second supporting device of at least 1 g.

8. A device as claimed in claim 2, which further comprises a second flexible base, a second supporting device for supporting the second base, the second supporting device being displaceable in a longitudinal direction to and from the deposition station and having at one of its ends a guiding member for such second supporting device, the guiding member for the second supporting device having a front end normally facing the deposition station, such front end for the guiding member for the second supporting device having a radius of small curvature (r) such as to impart to the second base a direction change, a second blocking device for selectively blocking displacement of the second base, a third driving device for displacing the second base and a fourth driving device for driving the second supporting device, the second base being coated with a coating, the second supporting device being movable in a direction away from the one supporting device while the second base is blocked from displacement, the second supporting device being movable at such a speed that the part of the flexible base at the front end of the guiding member of the supporting device is caused to make an abrupt direction change with a centripetal acceleration around the front end of the guiding member of the second supporting device of at least 1 g, the one and second flexible bases being arranged in parallel above each other with portions facing each other, and between which the adhesive, flexible material is intended to be conveyed, and the first and third driving devices for the one and second supporting devices being synchronized and adapted to be displaced simultaneously in the same direction.

9. A device as claimed in claim 2, wherein above the deposition station and above the movable supporting device is provided a guiding member with vertically provided pegs, the guiding member being vertically movable and adapted during the falling motion of the material towards the deposition station to guide the material by holding the pegs in contact therewith.

10. A device as claimed in claim 2, wherein a supporting member for receiving the material is positionable upon the base, the base being arranged to form the bottom of the supporting member, and the supporting member being horizontally displaceable to and from the deposition station.

11. A device as claimed in claim 2, wherein the coating coated on the base has a low surface tension.

12. A device as claimed in claim 4, wherein the loose material track is comprised of a plastic film.

13. A device as claimed in claim 5, wherein the loose material track is comprises of plastic film.

14. A device as claimed in claim 6, wherein the gas of the gas-lubricated bearing surface is air.

* * * * *